United States Patent [19]
Cyron et al.

[11] Patent Number: 4,822,766
[45] Date of Patent: Apr. 18, 1989

[54] CATALYST CARRIER FOIL AND METHOD OF MANUFACTURING THE SAME

[75] Inventors: Theodor Cyron; Wolfgang Staubwasser, both of Bergisch Gladbach, Fed. Rep. of Germany

[73] Assignee: Interatom GmbH, Bergisch-Gladbach, Fed. Rep. of Germany

[21] Appl. No.: 81,187

[22] Filed: Aug. 4, 1987

Related U.S. Application Data

[63] Continuation-in-part of Ser. No. 895,169, Aug. 11, 1986, abandoned.

[30] Foreign Application Priority Data

Aug. 12, 1985 [DE] Fed. Rep. of Germany ....... 3528881

[51] Int. Cl.$^4$ .......................... B01J 32/00; B01J 35/04
[52] U.S. Cl. ..................................... 502/439; 502/527
[58] Field of Search .................. 502/439, 527; 204/24, 204/38.6

[56] References Cited

U.S. PATENT DOCUMENTS 4,006,105  2/1977  Fedor et al. .................... 502/527 X

FOREIGN PATENT DOCUMENTS 2853023  6/1979  Fed. Rep. of Germany.
6813245  3/1970  Netherlands .......................... 204/24

Primary Examiner—W. J. Shine
Attorney, Agent, or Firm—Herbert L. Lerner

[57] ABSTRACT

A metallic carrier foil to be coated with ceramic catalytic material and a method for producing the foil, include an electroformed metal foil having a plurality of microscopic holes formed therein.

15 Claims, 1 Drawing Sheet

CATALYST CARRIER FOIL AND METHOD OF MANUFACTURING THE SAME

CROSS-REFERENCE TO RELATED APPLICATIONS

This application is a continuation-in-part of application Ser. No. 895,169, filed Aug. 11, 1986, now abandoned.

BACKGROUND OF THE INVENTION

1. Field of the Invention

The invention relates to a metallic catalyst carrier foil, especially formed of steel resistant to corrosion and/or to high temperatures, to be coated with ceramic catalytic material, and a method of manufacturing the same.

2. Description of the Related Art

Such thin metallic foils are preferably used as smooth or corrugated layers in the manufacture of catalyst carrier bodies. In general, such foils are first aligned to form a catalyst carrier body, which is a so-called matrix with honeycomb-like canals and the foils are subsequently coated. It is also known to apply the coating prior to winding-up or stacking the individual layers.

The actual coating with catalytic material represents an important and difficult step during the manufacture of catalysts. Since metal oxides and other ceramic materials are frequently used as catalysts, the carrier sheets must exhibit special properties so that good adherence of the coating is obtained.

German published, non-prosecuted application DE-OS No. 28 53 023 describes various metal foils which are suitable for coating. From this publication it is known that the adhesion of the coating is improved by suitable perforation, because bridges are formed between the layers coating both sides of the foil through the perforations. This publication only describes macroscopic holes with dimensions on the order of 1 mm which are produced by costly methods and are too large for optimum adherence of the coating.

Similarly, U.S. Pat. No. 4,006,105 discloses a catalyst in which a foil is slotted and processes into metal mesh with macroscopic holes. Netherlands patent No. 68 13 245 provides a method of drilling very small holes in a foil, but that method is not very economical since the foil must first be produced and then drilled.

It is furthermore mentioned in German published, non-prosecuted application DE-OS No. 22 26 662 that catalyst carrier foils can be formed by electroplated deposition of desired alloying components. In this connection, the possibility is also mentioned to make expanded metal from such foils which has macroscopic diamond-shaped holes. Carrier foils constructed in this manner also do not prevent individual parts of the coating from crumbling away.

SUMMARY OF THE INVENTION

It is accordingly an object of the invention to provide a catalyst carrier foil and a method of manufacturing the same, which overcomes the hereinafore-mentioned disadvantages of the heretofore-known methods and devices of this general type and to provide a metallic carrier foil which is suitable for coating with ceramic catalytic material and has particularly good adherence of the coating even under alternating thermal stress. The foil should also be producible as economically as possible.

With the foregoing and other objects in view, there is provided, in accordance with the invention, a metallic carrier foil, especially formed of high-temperature resistant and/or corrosion proof steel, to be coated with ceramic catalytic material, comprising an electroformed metal foil having a plurality of microscopic holes, substantially two per $mm^2$, formed therein.

The presence of a large number of very small holes which are distinctly smaller than those according to the state of the art permits a particularly well adhering coating to be provided, as will be explained in further detail with reference to the drawing. In addition, the foil can be produced economically.

In accordance with another feature of the invention, the holes constitute substantially between 10 and 70% and preferably substantially between 30 and 50% of the total surface area of the metal foil. This ratio of hole foil area to entire foil area in the case of microscopic holes, minimizes the danger of notch action and of tearing of the foil at an individual point and is also of advantage with respect to the stability of the foil and the cost of the material. During the electroforming operation, no deposition need be made at all on the parts of the material saved by the holes, which effects considerable savings.

In accordance with a further feature of the invention, the holes have given diameters and the holes are mutually spaced apart by regular spacings having substantially the same magnitude as the given diameters or other dimensions of the holes. This construction is particularly advantageous for the optimum utilization of the invention while the stability of the foil is preserved.

In accordance with an added feature of the invention, the metal foil has a given thickness and the holes have diameters being substantially one to ten times the given thickness. This has been found to be advantageous for the stability of the coil. As can be seen from the drawing, material bridges result from this choice of dimensions between the holes when using holes with approximately square cross sections at the narrowest point, for instance, so that optimum stability with minimum use of material is achieved. Naturally, deviations from these optimum dimensions are possible depending on requirements and the technical situation.

In accordance with an additional feature of the invention, the metal foil has a thickness of substantially between 30 and 300 $\mu$m, the holes have diameters of substantially between 30 and 300 $\mu$m, and the holes are mutually spaced apart by substantially between 30 and 300 $\mu$m. Advantageously, however, the thickness of the foil is between 30 and 60 $\mu$m and the diameter or other dimensions of the holes and the distances between the holes is between about 30 and 300 $\mu$m.

In accordance with yet another feature of the invention, the holes are substantially round. In general, it is desirable to provide round or approximately round holes, but the edges of the holes which are not round may also be rounded. Therefore, in accordance with yet a further feature of the invention, the holes have rounded edges.

In accordance with yet an added feature of the invention, the metal foil has two sides, and there are provided ceramic coatings applied on both of the sides of the metal foil, the ceramic coatings forming firm connecting bridges through the holes between the ceramic coatings on both of the sides of the metal foil, whereby substantially rivet-shaped coating fragments are formed which adhere to the metal foil upon the occurrence of cracks in the ceramic coatings. Due to a multiplicity of strong connecting bridges between the layers on both sides of the foil, a strong adhesion of the coating is achieved. Even if numerous cracks appear in the surface coating, for instance, due to alternating thermal stresses, approximately rivet-shaped coating fragments are generally produced which cannot separate from the foils even if the adhesion at the foil surface is only small. Furthermore, very small fragments which would have no hold of any kind in the case of macroscopic holes, can be held fast at the foil through the use of microscopic holes since fragments in the order of the holes seldom occur.

In accordance with yet an additional feature of the invention, there is provided at least one other layer electroformed on the metal foil and alloyed to the metal foil by diffusion, the at least one other layer leaving the holes free.

In accordance with still another feature of the invention, the metal foil and the at least one other layer are selected from the group consisting of iron, chromium and aluminum.

Foils that are perforated according to the invention can be produced by electroforming which is known per se in the art. However, with the other objects of the invention in view there is also provided a method of producing a metallic carrier foil, which comprises electroforming a metal foil with microscopic holes on a matrix, and removing the metal foil with the microscopic holes from the matrix. In accordance with another mode of the invention, there is provided a method which comprises electroforming at least one other layer on the metal foil and subsequently alloying the metal foil and the at least one other layer by diffusion while leaving the holes free of the at least one other layer. In accordance with a further mode of the invention, there is provided a method which comprises selecting the metal foil and the at least one other layer from the group consisting of iron, chromium and aluminum.

An advantage of this method is that the material saved by providing the holes need not be first deposited and then removed, so that only one operation is necessary and a corresponding amount of power and material (for instance, 50%) can be saved.

The individual layers may be formed of sub-alloys, i.e. of two or more of the alloying components required overall, if simultaneous deposition of such sub-alloys is possible.

In accordance with an added mode of the invention, there is provided a method which comprises forming a plurality of non-conductive microscopic points on the surface of the matrix for producing the holes in the metal foil when the metal foil is electroformed.

In accordance with an a concomitant mode of the invention, there is provided a method which comprises continuously rotating the matrix in the form of a roller or endless belt.

Other features which are considered as characteristic for the invention are set forth in the appended claims.

Although the invention is illustrated and described herein as embodied in a catalyst carrier foil and a method of manufacturing the same, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing.

DESCRIPTION OF THE PREFERRED EMBODIMENTS

Figure 1:
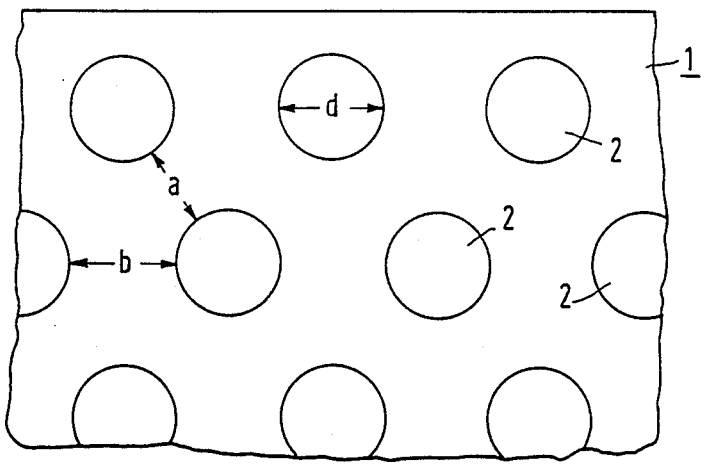
FIG. 1 is a greatly magnified fragmentary, diagrammatic, top-plan view of a portion of a foil according to the invention.

Referring now to the figures of the drawings in detail and first, particularly, to FIG. 1 thereof, there is seen a foil according to the invention having by way of example round holes with uniform mutual spacing. It should be noted that the drawing represents a very large magnification, since the portion shown in the drawing represents less than 1 mm of foil. The foil 1 has round holes 2 at uniform spacings a, b. The diameter d of the holes is approximately of the same order as the spacings a, b. The diameter d of the holes is furthermore preferably approximately equal to the thickness of the foil 1, as can also be seen from FIG. 2.

Figure 2:
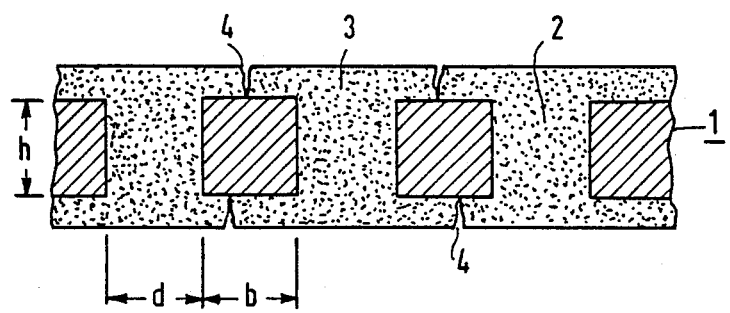
FIG. 2 is a fragmentary, cross-sectional view of the structure of a foil with a coating.

FIG. 2 shows a cross section through a coated foil according to the invention. This foil 1 also has holes 2 and is provided with a ceramic coating 3. This coating forms connecting bridges through the holes 2 so that no crumbling-away fragments of the coating can be produced even if numerous cracks 4 occur which generally appear at the thinnest points of the coating 3. In the worst case, the fragments produced have the form of a tiny rivet which remains anchored in the holes 2. The size relations between the diameter d of the holes, the thickness h of the foil and the size of the spacings b of the holes 2 are shown with the aid of FIG. 2. In a preferred embodiment, the diameter of the holes, the spacing of the holes and the thickness of the foil are roughly equal to each other.

The ceramic coating 3 as known in the art, is shown with somewhat exaggerated thickness. It should be pointed out that the ceramic coating is generally applied as a slurry of fine grain, the grain size being considerably smaller than the diameter of the holes 2. In this manner the formation of bridges between the two sides of the coating is assured even in the case of microscopic holes such as are proposed in the present invention. These bridges between the two sides of the coating make the adherence of the coating to the foil to a large extent independent of the adhesion of the coating at the foil surface.

Before discussing the FIG. 3 embodiment in detail, the electroforming process used to form the foil 31 in FIG. 3 will be discussed. The book Electroplating and Electroforming for Artists and Craftsmen by Lee Scott Newman and Jay Hartley Newman, published in 1979 by Crown Publishers, gives a detailed analysis and directions for electroforming all types of electroforms on all types of matrices. As described in that publication, the electroforming process uses a matrix on which a metal layer or electroform is deposited. If a non-metallic matrix is used, the matrix is covered with a conducting material, such as by painting or spraying. Surfaces that are not to be electroformed are covered with a resist or stop-off layer. The matrix is then placed in an electroforming tank and connected to a cathode so that it is covered with a layer of metal which duplicates every detail of the matrix. The matrix is then removed from the metal layer. The publication also describes how electroforming is used jointly with electroplating to create or enrich surface texture.

Pages 10-32 through 10-35 of the Handbook of Materials and Processes for Electronics, Charles A. Harper edition published in 1970 by McGraw-Hill Inc., discuss the advantages and disadvantages of the electroforming process and of the materials which may be used for the matrix on which the electroform is deposited, as well the methods of parting the electroform from the matrix.

European patent DE-PS No. 0 073 221 does not deal with electroforming, but it describes a method of high-rate alloy plating in which a matrix in the form of a belt is continuously coated with aluminum and chromium.

According to the invention, a thin metal film is first deposited by electroforming on a matrix in the form of a rotating metallic roller or an endless belt which is submerged in a galvanic bath and is connected as a cathode. The first film or layer is preferably formed of pure iron. Many microscopic points of the matrix are made non-conductive through insulating or perforating, so that no metal is deposited at those locations. The foil that is formed therefore has a multiplicity of microscopic holes. The foil is finally continually pulled off the roller or the belt. In other galvanic baths, further layers can be applied, such as chromium, aluminum and/or cerium. It is possible to further coat of the first belt with powder or through plasma spraying. It is essential for the carrier foil to be initially provided with many holes, which is only economically possible by electroforming.

The principal techniques of electroforming, at least for noncontinuous forms and the continuous coating of a belt, are well known, such as from the prior art described above. The details of such processes are therefore well known to one of ordinary skill in the art and need not be mentioned in detail herein. It is only essential for the present invention that the foil is directly created with holes, so that a second process step for producing the holes is not necessary and so that 30 to 70% of the material can be saved during the manufacturing process. The holes also improve the adhesive strength of the later coating, as already described in detail above.

After all of the necessary components of the desired alloy are applied, a homogeneous belt is produced generally by diffusion. However, the diffusion process can also be carried out after a catalyst body or similar article has been shaped in order to simultaneously connect contact areas.

Figure 3:
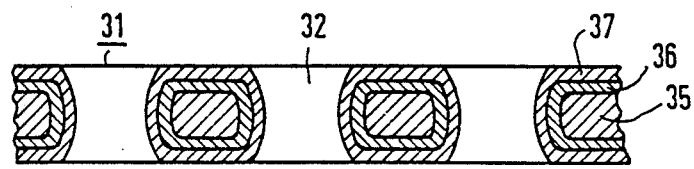
FIG. 3 is a fragmentary, cross-sectional view of the structure of a foil produced by electroforming prior to the diffusion of the components and prior to coating.

In order to illustrate the build-up of a foil made by electroforming, FIG. 3 diagrammatically shows a cross section through such a foil prior to the mutual diffusion of the individual alloying components. The foil 31 is formed of a first layer 35 which is prepared first and to which further alloying components 36, 37 are applied successively by electroforming. These layers are also formed on the insides of the holes 32 where, however, the desired final diameter of the holes 32 can be assured by proper dimensioning of the holes in the layer 35. The edges of the holes 32 may be rounded. The entire foil 31 is later alloyed by diffusion. Optionally, a coating may first be applied to the foil 31, depending on the application and also the extent of deformation when placing the foil into the desired shape.

The present invention is suitable for catalysts which are required to have a particularly long life and are subjected to high mechanical stresses during their life.

There is claimed:

1. Coated metallic carrier foil, comprising an electroformed metal foil having two sides and having a plurality of microscopic holes formed therein, said metal foil having a thickness of substantially between 30 and 300 $\mu$m, said holes having diameters of substantially between 30 and 300 $\mu$m, and said holes being mutually spaced apart by substantially between 30 and 300 $\mu$m, and ceramic coatings applied on both of said sides of said metal foil, said ceramic coatings forming firm connecting bridges through said holes between said ceramic coatings on both of said sides of said metal foil.

2. Carrier foil according to claim 1, wherein said holes constitute substantially between 10 and 70% of the total surface area of said metal foil.

3. Carrier foil according to claim 1, wherein said holes constitute substantially between 30 and 50% of the total surface area of said metal foil.

4. Carrier foil according to claim 1, wherein said holes have given diameters and said holes are mutually spaced apart by regular spacings having substantially the same magnitude as said given diameters.

5. Carrier foil according to claim 1, wherein said holes have diameters being substantially one to ten times said thickness of said metal foil.

6. Carrier foil according to claim 1, wherein said holes are substantially round.

7. Carrier foil according to claim 1, wherein said holes have rounded edges.

8. Coated carrier foil according to claim 1, wherein substantially rivet-shaped coating fragments are formed which adhere to said metal foil upon the occurrence of cracks in said ceramic coatings due to thermal stress.

9. Coated carrier foil according to claim 1, including at least one layer electroformed on said metal foil and alloyed to said metal foil by diffusion, said at least one other layer leaving said holes free.

10. Coated carrier foil according to claim 9, wherein said metal foil and said at least one other layer are selected from the group consisting of iron, chromium and aluminum.

11. Method for producing a coated metallic carrier foil, which comprises electroforming a metal foil on a matrix with two sides, with a foil thickness of substantially between 30 and 300 $\mu$m and with microscopic holes formed in the foil having diameters of substantially between 30 and 300 $\mu$m and mutual spacings of substantially between 30 and 300 $\mu$m, removing the metal foil with the microscopic holes from the matrix, and subsequently applying ceramic coatings on both of the sides of the foil forming firm connecting bridges through the holes between the ceramic coatings on both of the sides of the foil.

12. Method according to claim 11, which comprises forming a plurality of non-conductive microscopic points on the surface of the matrix for producing the holes in the metal foil when the metal foil is electroformed.

13. Method according to claim 11, which comprises continuously rotating the matrix in the form of a roller or endless belt.

14. Method according to claim 11, which comprises electroforming at least one other layer on the metal foil and subsequently alloying the metal foil and the at least one other layer by diffusion while leaving the holes free of the at least one other layer.

15. Method according to claim 14, which comprises selecting the metal foil and the at least one other layer from the group consisting of iron, chromium and aluminum.

* * * * *